(12) United States Patent
Bhattacharyya et al.

(10) Patent No.: US 12,003,505 B2
(45) Date of Patent: * Jun. 4, 2024

(54) CUSTOM AUTHORIZATION OF NETWORK CONNECTED DEVICES USING SIGNED CREDENTIALS

(71) Applicant: Amazon Technologies, Inc., Seattle, WA (US)

(72) Inventors: Ramkishore Bhattacharyya, Woodinville, WA (US); Rameez Loladia, Seattle, WA (US); William Alexander Stevenson, Seattle, WA (US); Ashutosh Thakur, Bellevue, WA (US); Rodrigo Diaz Martin, Seattle, WA (US); Andrew John Kiggins, Seattle, WA (US); Xin Yi Liu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 304 days.

This patent is subject to a terminal disclaimer.

(21) Appl. No.: 17/113,858

(22) Filed: Dec. 7, 2020

(65) Prior Publication Data
US 2021/0092115 A1 Mar. 25, 2021

Related U.S. Application Data

(63) Continuation of application No. 15/728,341, filed on Oct. 9, 2017, now Pat. No. 10,862,883.

(51) Int. Cl.
*H04L 29/06* (2006.01)
*H04L 9/32* (2006.01)
*H04L 9/40* (2022.01)

(52) U.S. Cl.
CPC ........ *H04L 63/0861* (2013.01); *H04L 9/3242* (2013.01); *H04L 9/3247* (2013.01);
(Continued)

(58) Field of Classification Search
CPC . H04L 9/3242; H04L 9/3247; H04L 63/0442; H04L 63/061; H04L 63/0807; H04L 63/0861
See application file for complete search history.

(56) References Cited

U.S. PATENT DOCUMENTS 10,158,480 B1 * 12/2018 Winklevoss .......... H04L 9/3247
10,382,213 B1    8/2019 Rafn et al.
(Continued)

OTHER PUBLICATIONS

Wikipedia—Access token (Year: 2010).*

*Primary Examiner* — Tri M Tran
(74) *Attorney, Agent, or Firm* — Davis Wright Tremaine LLP

(57) ABSTRACT

Systems and methods are disclosed herein for enforcing digital signature on a token useable by a network-addressable device to invoke service calls on services of a service provider. A device platform service of the service provider may receive service calls from the network-addressable device and cause one or more operations to be performed by other services of the service provider in response to receiving a notification that the request is authentic. An authentication service analyses a fingerprint associated with a request submitted by the device and determines whether it is a match to a fingerprint generated from cryptographic authentication information provided by the user in connection with registering the network-addressable device.

20 Claims, 10 Drawing Sheets

(52) U.S. Cl.
CPC .......... *H04L 63/0442* (2013.01); *H04L 63/06* (2013.01); *H04L 63/061* (2013.01); *H04L 63/0807* (2013.01)

(56) References Cited

U.S. PATENT DOCUMENTS

| | | | | |
|---|---|---|---|---|
| 10,425,465 | B1* | 9/2019 | Jha | H04L 67/565 |
| 2003/0014372 | A1* | 1/2003 | Wheeler | H04L 9/3231 |
| | | | | 705/71 |
| 2013/0219473 | A1* | 8/2013 | Schaefer | G06F 21/31 |
| | | | | 726/4 |
| 2014/0298035 | A1 | 10/2014 | Tredoux et al. | |
| 2015/0095999 | A1* | 4/2015 | Toth | H04L 9/3263 |
| | | | | 726/6 |
| 2017/0141926 | A1* | 5/2017 | Xu | H04L 63/0209 |
| 2019/0207772 | A1* | 7/2019 | Hecht | H04L 63/10 |

* cited by examiner

CUSTOM AUTHORIZATION OF NETWORK CONNECTED DEVICES USING SIGNED CREDENTIALS

CROSS-REFERENCE TO RELATED APPLICATIONS

This application is a continuation of U.S. patent application Ser. No. 15/728,341, filed Oct. 9, 2017, entitled "CUSTOM AUTHORIZATION OF NETWORK CONNECTED DEVICES USING SIGNED CREDENTIALS," the disclosure of which is hereby incorporated herein in its entirety.

BACKGROUND

An increasing number and variety of devices are being connected to networks to fulfill user needs. Some of these devices may be objects and machines, such as refrigerators, watches, motion detectors, and automobiles that were not previously able to connect to networks. These devices are commonly known as "internet of things" devices. As these devices become more ubiquitous, opportunities may increase for providing new and innovative ways of enabling these devices to interact with each other and other computing devices. One such opportunity is in the realm of cloud-based services, wherein these devices may interact with a service. However, in such a realm, there are also opportunities for malicious users to obtain and use the credentials of other users to flood the cloud-based services with excessive amounts of traffic, or to invoke service requests that cause another user to incur costs without their authorization.

BRIEF DESCRIPTION OF THE DRAWINGS

Various techniques will be described with reference to the drawings, in which.

DETAILED DESCRIPTION

Figure 1:
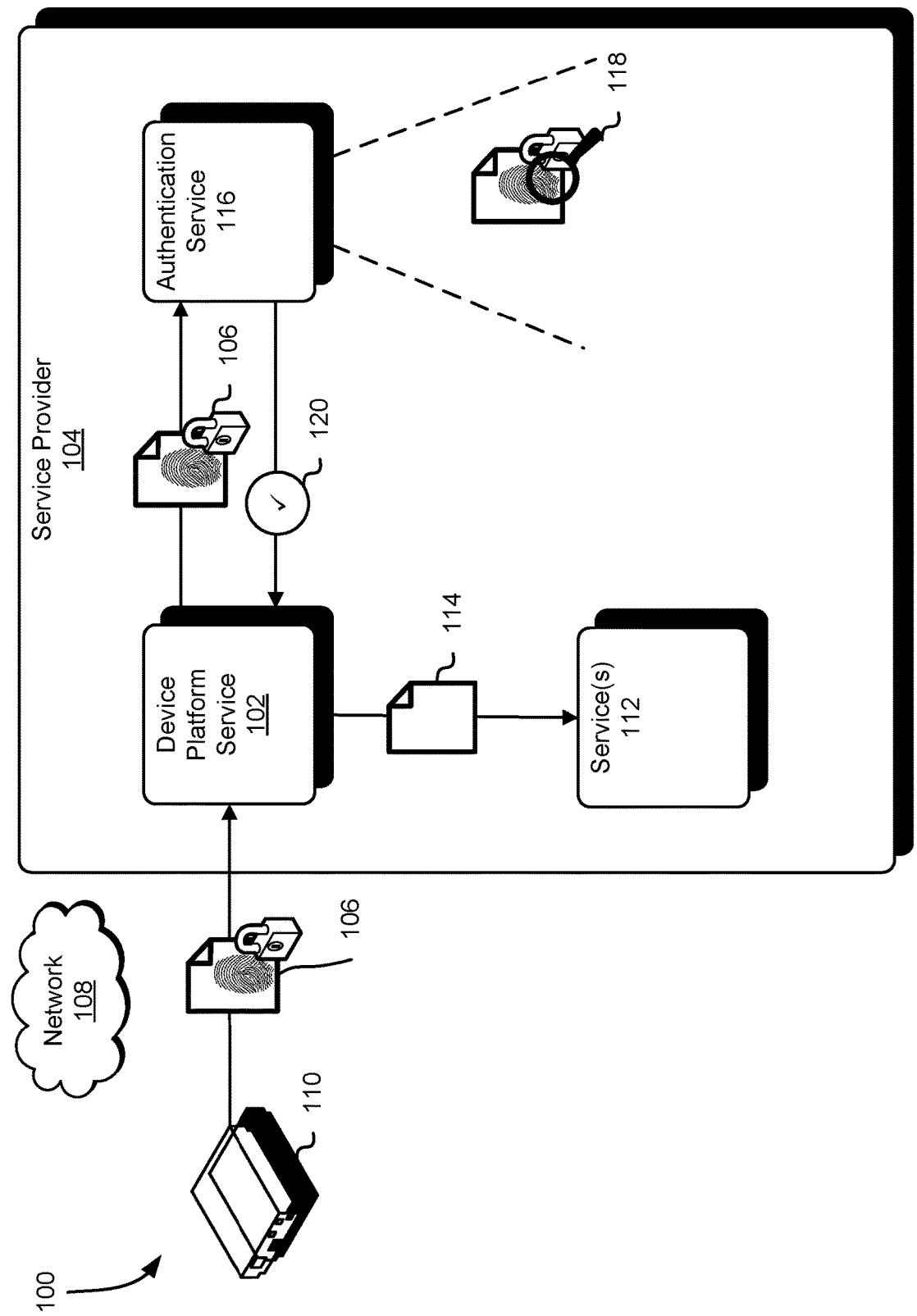
FIG. 1 illustrates an environment in which various embodiments may be practiced.

Techniques described and suggested herein include systems and methods for enforcing digital signature on a token used to invoke one or more operations by a service of a computing resource service provider. A device platform service of the service provider may interact with network-addressable devices, such as "internet of things" devices, to authenticate and/or authorize a request to invoke operations specified in the request. A credential generation service may provide a token to a user during registration of the network-addressable device, the token being useable to invoke requests to the device platform service. To prevent malicious users from using publicly available aspects of the token to invoke illegitimate requests to the device platform service, the device platform service may support verification of a request by an authentication service prior to invoking a service call for an operation.

A credential generation service may receive a request to register a network-addressable device. A user may provide cryptographic authentication information to the credential generation service and receive a token useable by the device. The cryptographic authentication information may include an indication of a hash function to be performed on the token, an authorizer identifier, and a cryptographic key. The cryptographic authentication information may be stored in data storage in association with identification information, such as the authorizer identifier or a user identifier (e.g., account identifier, user name).

During the registration process, the user may provide a record to the service provider indicating authorized devices that may submit valid requests to the service provider. Upon receiving a request, an agent of the device platform service may obtain the authorizer identifier from the request and compare it with a set of authorized identifiers provided in the record. If the authorizer identifier matches an authorized identifier of one of the authorized devices, then the agent may cause the authorization service to proceed with verifying the authenticity of a request. Other information may be cached and used to increase efficiency of the authentication process, such as by caching information identifying results and details associated with authentication.

To generate a valid request for causing performance of an operation by a service of the service provider, the user may perform a hash function on the token to generate a token fingerprint. The user may then encrypt the token fingerprint to create an encrypted token fingerprint. The device may submit the encrypted token fingerprint to a device platform service in connection with a request for performing one or more operations by services of the service provider. An authentication service of the service provider may analyze the encrypted token fingerprint to determine whether it is authentic. The authorization service may decrypt the encrypted token fingerprint to generate a token fingerprint. The authorization service may also obtain a copy of the token provided to the user during the registration process and obtain the cryptographic authentication information provided by the user. The authentication service may perform the hash function indicated by the user on the token to generate a second token fingerprint. The authentication service may compare the first and second token fingerprints to each other and, if they match, provide a notification that the request is authentic and should be fulfilled. Accordingly, the device platform service may cause fulfillment of the request in response to receiving the notification. According to this process and system, a malicious user cannot use the token to initiate illegitimate service requests that waste the resources of both the user and service provider.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an environment 100 for authenticating and fulfilling requests, from a client device, to perform a service associated with a device platform service of a computing resource service provider. A device platform service 102 of a computing resource service provider 104 receives a request 106 over a connection to a network 108 from a network-addressable device 110. The network-addressable device 110 may be a handheld device, a wearable device, a remote sensor, a home appliance, a wireless peripheral, a network-addressable camera, a smart home device such as a network-addressable lightbulb, wall socket, or thermostat, or other network entity. The network-addressable device 110 may be an Internet of Things (IoT) device that provides some functionality and is connected to the network 108 (e.g., Internet), but which does not necessarily have a physical user interface built into the device. In general, the device 110 is an IP addressable device that supports the ability to directly address or be addressed by other network devices, and which may be configurable to initiate a request to a service provider over a network in response to detection of a stimulus. The device 110 may comprise hardware, such as one or more processors and memory, and software stored in the memory that, as a result of execution by the one or more processors, causes the device 110 to perform one or more functions, including providing the request 106. The hardware of the device 110 may further include one or more sensors and/or a transmitter configured to transmit the request 106 over the network 108. The device 110 may be configured to transmit a request 106 having a format corresponding to a request format used by the device platform service 102.

The network 108 may be local area network connected to the internet in a home, work, public, or private environment. The network connection to the network 108 may be established using a wired or wireless connection. In various examples, a wired connection is established using an Ethernet interface, a USB interface, a FireWire interface, a serial interface, a powerline interface, or a fiber-optic interface. In additional examples, a wireless connection is established between the network-addressable device 110 and the service provider 104 using a Wi-Fi, 802.11, or Bluetooth interface.

The device platform service 102 is a computer system that connects to network-addressable devices that are useable to construct a network of interconnected devices commonly known as the "internet of things." The computer system of the device platform service 102 may, for instance, comprise one or more processors and memory that stores executable instructions whose execution by the one or more processors causes the device platform service 102 to perform operations described herein. The device platform service 102 supports receiving requests from these network-addressable devices, process the requests, and route the requests to endpoints of the service provider 104 for fulfillment. The service provider 104 may provide an environment within which one or more applications, processes, services, virtual machines, and/or other such computer system entities may be executed to provide one or more computing resources to customers. In embodiments described herein, a user may be a person, or may be a process running on one or more remote computer systems, or may be some other computer system entity, user, or process. The service(s) 112 of the service provider is a service of the service provider 104, and may correspond to one or more services provided. Examples of the service(s) 112 include a cryptography service for remotely performing cryptographic functions, a data storage service for remotely storing data, a computing resources provisioning service that supports remotely providing computing resources (e.g., virtual machine instantiation, serverless computing, application execution, databases), electronic commerce services, and website hosting services, by way of non-limiting example.

The request 106 may be a request addressed to the device platform service 102 to cause performance of one or more operations by the service(s) 112. As one example, the service 112 may be a software execution service comprising a computer system that includes one or more processors and memory storing executable instructions. At least some of the executable instructions may be stored in a software container located in memory space dedicated to a user. The service 112 may execute the instructions in the software container in response to receiving an authorized request 114 from the device platform service 102 instructing the service 112 to do so. The request 114 may be provided via an interface, such as an Application Programming Interface ("API"), to execute the instructions.

To facilitate access to the services provided by the service 112 by network-addressable devices, such as the device 110, the endpoint for initiating a desired service may be public, such that the service 112 may fulfill a request received that includes an operation identifier in association with a request to perform the operation. However, this feature may cause some vulnerability in the system. For instance, the operations requested may have a monetary cost associated with performance, such that a user associated with the operation may be billed for performance of the operation. If a malicious user guesses or discovers the operation identifier, the malicious user may initiate numerous instances of the operation, causing the user associated with the operation to incur costs for operations they did not initiate. Moreover, a malicious user may initiate a large number of requests in a short period of time to overload the service 112, which may adversely affect the performance of the service 112. To address this potential vulnerability, the device platform service 102 may verify the authenticity of the request 106 as a condition precedent to providing the request 114 to the service(s) 112.

In particular, the device platform service 112 may fulfill requests 106 having encrypted verification information that includes credential identification information, user information, and/or a digital signature of a credential. The encrypted verification information may include a token fingerprint encrypted using a cryptographic key of the user. The content and/or format of the request 106 is described in greater detail below. The device platform service 102 may make a request 106 having the verification information available to an authentication service 116 of the service provider 104, such as by transmitting the request 106, storing it in a predetermined memory space for requests accessible by the authentication service 116, or by including the request 106 in a queue of requests to be evaluated by the authentication service 116. The authentication service 116 may analyze 118 some or all of the verification information provided to determine whether the request 106 is a request that was authorized for transmittal to the service provider 104 by the user or an authorized associate thereof, or whether the request 106 was provided by an unauthorized entity. Based on a determination that the request 106 was provided by or under the approval of an authorized user, the authentication service 116 may transmit or otherwise make available to the device platform service 102, a notification 120 that the request 106 is authorized. Conversely, in response to determining that some or all of the verification information does not correspond to verification previously provided to the service provider 104, the device platform service 102 may provide a notification that the request 106 is unauthorized and/or perform one or more remediation actions, as described herein. Although the authentication service 116 is depicted as being an entity separate from the device platform service 102, this is not necessarily the case. In one embodiment, the device platform service 102 may be comprised of the authentication service 116. For instance, the authentication service 116 may be a backend to the platform service 102 that authenticates the verification information and notifies a frontend of the results of the authentication. In one embodiment, the authentication service 116 may be a service separate to the device platform service 102, as described above.

Figure 2:
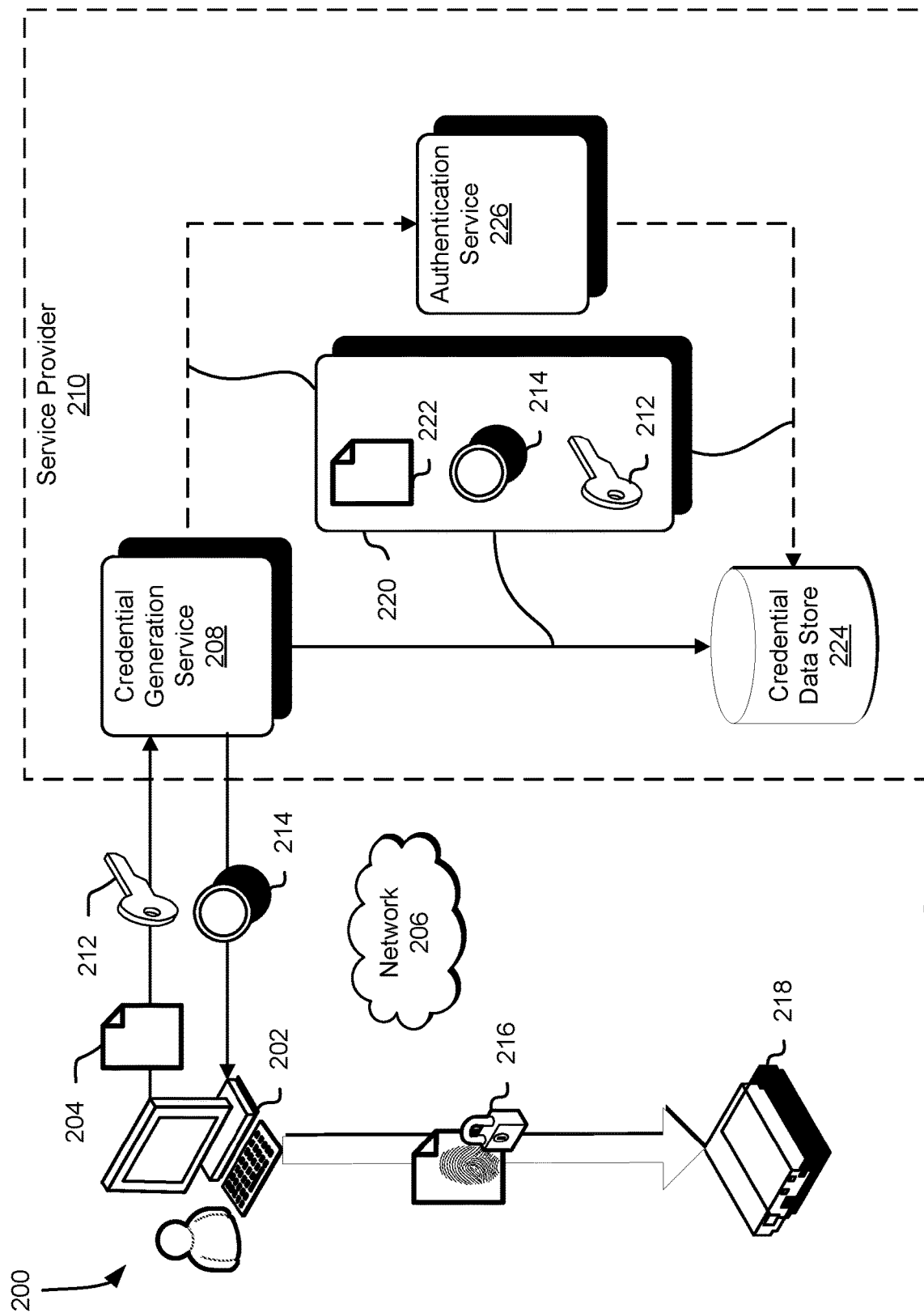
FIG. 2 illustrates an environment for registering a device for use with a computing resource service provider.

FIG. 2 shows an environment 200 for exchanging cryptographic information among various entities according to embodiments described herein. As a preliminary process to authenticating the request to cause performance of one or more operations by the service(s) described above, a user 202 may exchange cryptographic information with various entities illustrated. The user 202 may be a customer of a computing resource service provider that provides a device platform service, such as an "internet of things" service, for enabling "internet of things" devices to securely interact with services of the service provider and other devices. The user 202 may send a request 204, over a connection to a network 206, for generating a new credential in association with a service of a service provider. The request 204 may be received by a credential generation service 208 that generates credentials associated with a user and a service. The user 202 may include a computer system including one or more processors and memory that stores executable instructions whose execution by the one or more processors causes the computer system to be operable by a person to send the request 204. The request 204 may be sent via any appropriate method, such as over an interface provided on a webpage provided by the credential generation service 208 or a service associated therewith, via a secure connection established between the user 202 and the generation service 208, or by email. In one embodiment, the credential generation service 208 may be a service of a computing resource service provider 210; however, in one embodiment, the credential generation service 208 may be a service separate from the service provider 210.

The request 204 to generate a new credential may include various data objects and information associated with the user and/or the service of the service provider. The request 204 may include, or otherwise be associated with, an indicator (i) a cryptographic key 212 of the user, and/or (ii) information identifying an authorizer. The request 204 may include other information, such as information identifying a service of the service provider 210 to be associated with the new credential; information identifying the user; and/or information identifying a fingerprint generation method. The user 202 may register a cryptographic key 212 with the credential generation service 208 of the user 202 in association with the request 204, such as by providing the cryptographic key 212 as an attachment to the request 204, or by identifying the key 212 in the request 204. The cryptographic key 212 may be provided to cryptographically protect a credential provided to the device platform service by a network-addressable device, as described herein. In one embodiment, the cryptographic key 212 may be a public key of a public/private key pair generated according to an asymmetric key algorithm, wherein the user 202 maintains the private key as a secret. In one embodiment, the cryptographic key 212 may be a part of a symmetric key pair shared as a secret between the user 202 and the credential generation service 208. In one embodiment, the request 204 may register a plurality of keys. An authorizer is an identifier that is provided by the user and which is associated, in data storage, with a token generated by the credential generation service 208. The authorizer may be an identifier or name, such as a value or string of characters, provided by the user 202. The authorizer may be associated with a token generated by a credential generation service, and a cryptographic key provided by the user for verifying a signature of requests to a device platform service. The authorizer may also be associated with other cryptographic authentication information in data storage, such as a hash function specified by the user that will be used to generate a hash of the token.

Other information may be provided with the request 204. The information of the request 204 identifying a service or resource to be associated with the new credential may identify the service by an appropriate method. The information identifying the service may specify a unique identifier for the service or resource that is publicly available. For instance, the unique identifier may include a name or number unique to the service. The unique identifier may be an identifier formatted according to a proprietary resource identifier format of the service provider 210, and may include a service name, a partition or region in which the service is located, and/or a particular resource within the service that is to be accessed. The information identifying the user may specify a unique identifier of the user 202 submitting the request 204. For instance, the unique identifier of the user 202 may include an account name or number. The unique identifier may be separate from or included in the unique identifier for the service. The information identifying a fingerprint generation method may be formatted in an appropriate method, such as a string identifying the method (e.g. "SHA-1"), or by a unique identifier for the method that the service provider 210 makes publicly available. The information identifying a fingerprint generation method is for a method that the user 202 will use to generate a digitally signed token fingerprint, as described below. The method of generating a fingerprint may be a hash function known to those of ordinary skill in the art, as described below in greater detail with respect to FIG. 4.

The credential generation service 208, in an embodiment, is a computer system that generates a token 214 useable by a network-addressable device for submission to a device platform service to cause performance of one or more operations by a service of the service provider 210. The credential generation service 208 may be a service for managing access to one or more resources and/or services of the service provider 210 in association with an account of the user 202. The credential generation service 208 may, for instance, comprise one or more processors and memory that stores executable instructions whose execution by the one or more processors causes the credential generation service 208 to perform operations described herein. The token 214 is a credential for the network-addressable device that may be used to authenticate the identity of the network-addressable device when communicating with the device platform service. In one embodiment, the credential generation service 208 may sign the token 214 using a private key of a public/private key pair held by the generation service 208. The credential generation service 208 may also generate identification information for the token 214 that is useable to identify the token—for example, the identification information may be a string of characters unique to the token 214 that is stored in connection with the token 214 in a credential data store 208. The credential generation service 208 may provide the token 214 generated to the user 202 in fulfillment of the request 204, and may additionally provide the token identification information to the user 202.

The user 202 may generate a fingerprint of the token 214 received from the credential generation service 208 using a fingerprint generation method selected by the user 202. For instance, the user 202 may apply a hash function to the token 214 to produce a fingerprint of the token 214. Examples of hash functions may include functions that are useable to map data to a bit string having a fixed size, such as secure hashing algorithms (e.g., SHA-1, SHA-2, BLAKE, BLAKE2), checksum algorithms (e.g., MD5 algorithm), and message digest algorithms (e.g., RIPEMD, HMAC), by way of non-limiting example, The user may then encrypt the fingerprint of the token 214 using a cryptographic key to produce an encrypted token fingerprint 216. In one embodiment, the user 202 may sign the token 214 using a private key of a public/private key pair held by the user 202. The private key used by the user 202 to sign the token 214 is distinct from a key of a public/private key pair that the credential generation service 208. In one embodiment, the user 202 may sign the token 214 using a symmetric key held as a secret between the user 202 and the credential generation service 208, wherein the symmetric key is generated according to a symmetric key algorithm. In such an embodiment, the symmetric key used to sign the token 214 is different than the key that may be used by the credential generation service 208 to sign the token 214. The user 202 may provide the encrypted token fingerprint 216 to a network-addressable device 218, as described herein. For instance, the user 202 may upload or otherwise cause the network-addressable device 218 to store the encrypted token fingerprint 216 in memory, such that the network-addressable device 218 may use the signed token 216 in connection with requests to a device platform service, as described herein.

The credential generation service 208 may cause information provided by the user 202 and the token 214 generated to be stored in a credential data store 224. The credential generation service 208 may send a request causing the credential data store 224 to store information 220 provided or generated in association with the request 204. The information 220 may include the token 214, information 222 provided by the user 202 in association with the request 204 (e.g., authorizer identifier, hash function identifier, user identifier, resource identifier) other information, and the cryptographic key 212. The credential generation service 208 may cause the cryptographic key 212, and other information to be stored and indexed in the credential database 224 in association with the authorizer identifier and/or user identifier described above. The other information (e.g., token, hash function identifier, resource identifier) may be stored and indexed in association with the authorizer identifier and/or user identifier.

In one embodiment, the credential generation service 208 may cause an authentication service 226 of the service provider 210 to store the information 220 in the credential data store 224. The authentication service 226 may be an access management service of a device platform service described in further detail below. The authentication service 226 may be a computer system that stores and/or obtains authentication credentials and related information to verify the requests for interacting with the device platform service and other services described below. The computer system of the authentication service 226 may comprise one or more processors and memory that stores executable instructions whose execution by the one or more processors causes the authentication service 220 to perform operations described herein. In this embodiment, the authentication service 226 may act as an intermediary between the credential generation service 208 and the credential data store 224.

Figure 3:
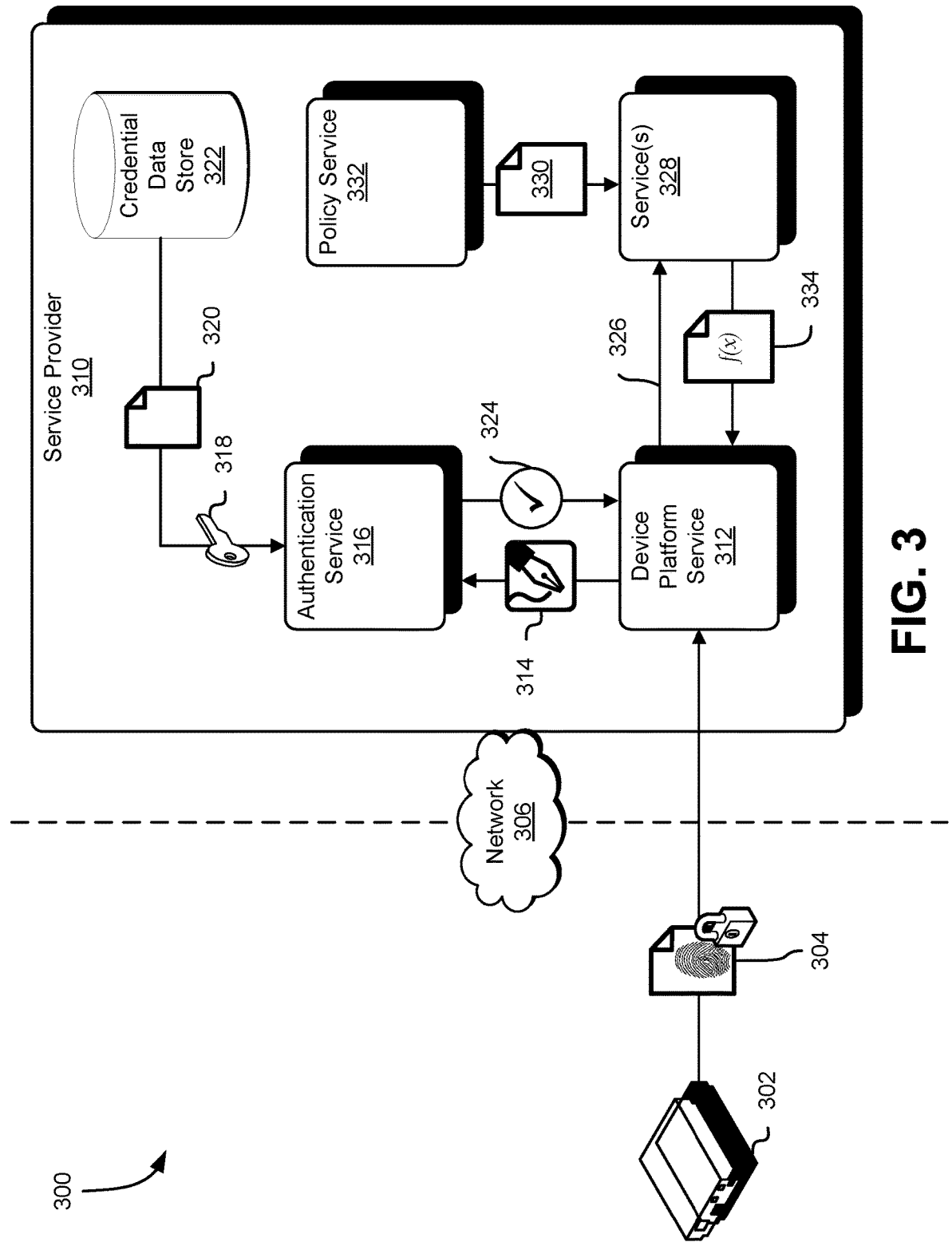
FIG. 3 illustrates an environment for verifying the authenticity of a request to a service from the device.

FIG. 3 illustrates an environment 300 for verifying a request to perform an operation submitted to a service provider by a network-addressable device. A network addressable device 302 submits a request 304, over a network 306, to cause a service 328 of a computing resource service provider 310 to perform one or more operations. The request 304 may include an encrypted token fingerprint, and identification information, such as user account identification information and/or an authorizer identifier. The identification information may be an indicator of a method of verifying authenticity of the request. The indicator may indicate cryptographic authentication information to be retrieved from data storage for verifying the authenticity of a request, as described below. The indicator, for example, may be an authorizer identifier that is useable to obtain, from data storage, a hash function and a cryptographic key specified by a user. The request 304 may further include the token, or information useable by the device platform service 312 to obtain the token. The device platform service 312 of the service provider 310 receives the request 304, either directly or via an intermediary service of the service provider 310 configured to route network traffic, and processes information from the request 304. In particular, the device platform service 312 obtains, from the request 304, the identification information and a token signature 314. The device platform service 312 may provide the identification information (e.g., authorizer identifier, user account identification information) and the token signature 314 to an authentication service 316 of the service provider. The device platform service 312 and the authentication service 316 correspond to the device platform service and the authentication service described above.

The authentication service 316 obtains a cryptographic key 318 and information 320 from a credential data store 322 to verify the token signature 314. The authentication service 316 may obtain cryptographic key 318 and the information 320 in response to sending a request for authentication information to the credential data store 322. As described below in greater detail, the authentication service 316 may verify that the identification information corresponds to identification information stored in memory before obtaining credential information from the credential data store 322. This prevents malicious users from overloading or flooding the credential data store 322 and associated systems with bogus requests to obtain credential information. After verifying that the identification information corresponds to a valid authorizer, the authentication service 316 may submit a request to obtain credential information to the credential data store 322 in association with the identification information of the request 304. The credential data store 322 may then search for and obtain credential information associated with the identification information. If the credential data store 322 finds a match to the identification information, the credential data store 322 may obtain the cryptographic key 318 and the information 320 corresponding to the identification information. The cryptographic key 318 and information 320 respectively correspond to cryptographic key and information provided by the user to the credential generation service described above with respect to FIG. 2. For instance, the cryptographic key 318 may be a public key of the public/private key pair of the user; and the information 320 may include information identifying a service of the service provider 310 associated with the new credential, information identifying the user, and/or information identifying the fingerprint generation method, as described above with respect to FIG. 2.

The authentication service 316 may use the cryptographic key 318 and some or all of the information 320 to verify the authenticity of the request 304, as described below. In response to verifying that the request 304 is authentic or inauthentic, the authentication service may provide an indication 324 of the authenticity of the request 304. In one embodiment, the notification 324 may be provided directly to the device platform service 312, which may fulfill the request 304 if the notification indicates that the request is authentic. On the other hand, the device platform service 312 may decline fulfillment of the request 304 in response to receiving a notification 324 that the request is inauthentic.

The device platform service 312 may, in response to receiving the notification 324 that the request is authentic, may send a request 326 to a service 328 to perform one or more operations for fulfilling the request received from the network-addressable device 302. The request 326 may include the token included from, or obtained using information included in, the request 304. The service 328 may be a serverless computing service that executes code on behalf of a customer, a data storage service that stores and retrieves data, a data processing service that processes and/or transfers information, or any other appropriate service. The service 328 may obtain policy information 330 from a policy service 332 using the token provided in the request 326. The policy service 332 may be a policy service for authorizing performance of operations, such as by securely controlling access to one or more services provided by the service provider in association with users and/or groups of users associated with an account. The policy information may specify permissions for the users and/or groups of users. The policy information 330 may additionally specify instructions and parameters for performing various functions associated with the token, or may identify a resource of the service provider 310 to access for performing one or more operations. Users (e.g., customers) of the service provider may define the policies of the policy information and the functions for evaluating the policies. In addition, a policy may define permissions, such as by defining a set of conditions whose satisfaction suffices to authorize fulfillment of a request. The service 328 may then perform one or more operations according to the policy information 330. For instance, the service 328 may access a resource specified in the policy information 330 and execute the code contained therein, or may retrieve an object stored in a location specified in the policy information 330. The service 328 may provide a result 334 of the operation performed to the device platform service 312 or to another service of the service provider 310.

Figure 4:
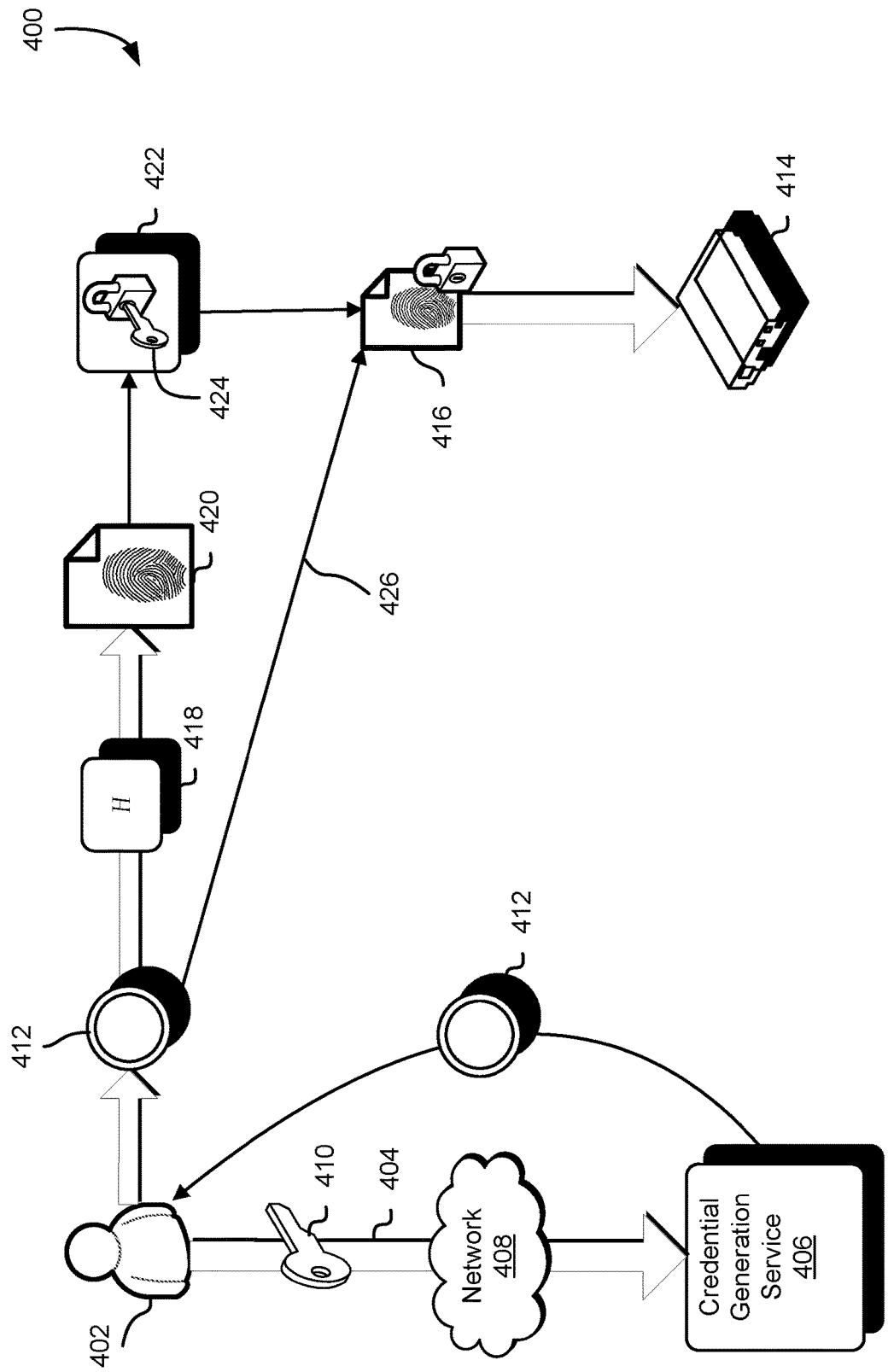
FIG. 4 illustrates a diagram for generating and providing cryptographic authentication information for the device.

FIG. 4 shows a diagram 400 illustrating a process for providing a network addressable device with an encrypted token fingerprint, as described herein. As described above with respect to FIG. 2, a user 402 submits a request 404, over a network 408, to a credential generation service 406 to generate a new credential in association with information of the request 404. A cryptographic key 410 of the user 402 may be associated with the request 404, as described above. The cryptographic key 410 may be a public key of a public/private key pair generated using an asymmetric key algorithm. In response, the credential generation service 406 may provide a token 412 to the user 402 that is associated with a network-addressable device 414 identified in the information of the request 404. The term "token" may refer to a string of values comprising alphanumeric characters that is useable to provide access to a resource.

The user 402 may then use the token 412 to generate an encrypted token fingerprint 416. As a first step the token 412 is applied as an input to a hash function 418 to generate a fingerprint 420 of the token 412. As described above, examples of hash functions include hashing algorithms, checksum algorithms, and message digest algorithms that are usable to map data of an input having a variable size to a unique bit-string having a fixed size. The fingerprint 420 may then be encrypted 422 using a private key 424 of the user 402. In one embodiment, the key 424 corresponds to the private key of the public-private key pair discussed above with respect to the cryptographic key 410. Encrypting the fingerprint 420 may include performing a cryptographic algorithm on the fingerprint 420 using the key 424. In one embodiment, the key 424 and the key 410 may be matching symmetric keys generated according to a symmetric key algorithm. Example cryptographic algorithms, include cryptographic algorithms for digital signatures. A computer system of the user 402 may be configured (e.g., with software and/or hardware (e.g., a crypto-processor)) for performing other cryptographic algorithms, some of which have associated uniqueness constraints. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others.

The encrypted token fingerprint 416 is produced as a result of encrypting 422 the fingerprint 420. The token 412 may be associated 426 with the encrypted token fingerprint 416. In particular, an identifier of the token 412 that was provided by the credential generation service 406 may be associated with the encrypted token fingerprint 416, or the token 412 may be associated with the token fingerprint 416 such that the token 412 is provided to a device platform service with the token fingerprint 416. This facilitates obtaining the appropriate token for verification of the encrypted token fingerprint 416, as described below. The encrypted token fingerprint 416, with the token identifier, may be provided to the network-addressable device 414.

Figure 5:
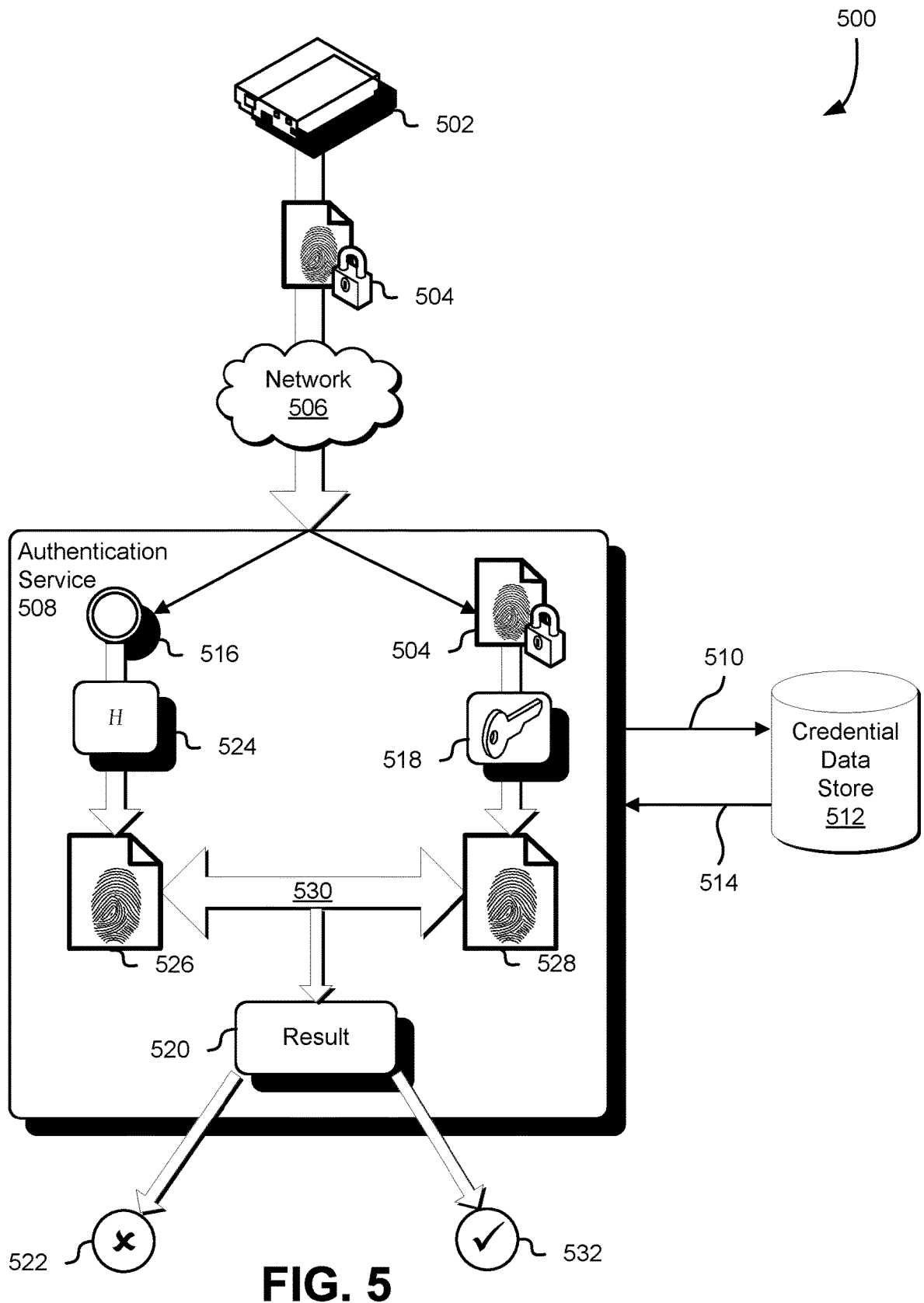
FIG. 5 illustrates a diagram for authenticating a request associated with cryptographic authentication information submitted to a service by the device.

FIG. 5 shows a diagram 500 for verifying an encrypted token fingerprint 504 transmitted by a network-addressable device 502, such as the device associated with the user described above. The encrypted token fingerprint 504 may be stored in memory of the device 502 and transmitted to a device platform service of the service provider based on the occurrence of a predetermined condition, such as in response to detection of a stimulus. In one example, the network-addressable device 502 may be a home security device that a user programs to transmit a communication including the encrypted token fingerprint 504 to the device platform service based on detecting motion. The encrypted token fingerprint 504 may be transmitted over a connection to a network 506, such as a wireless or wired connection described above.

An authentication service 508 of the service provider may receive the encrypted token fingerprint 504 via one or more other services, such as the device platform service described above. The encrypted token fingerprint 504 received may be included in a request comprising a request header and a request body. The request body may specify information regarding a condition that the network-addressable device is configured to monitor or produce a request in response to. The request header may be formatted according to an appropriate format, which may include a proprietary format of the service provider. An example request header may appear as follows:

```
GET /mqtt HTTP/1.1
Host: ANEXAMPLEXXXXXX.iot.WEST.service.com
Upgrade: websocket
Connection: Upgrade
Authorizer_Name=Foo
Authorization_Token=bar
Key_Name=Key1
Token_Signature=VALUE
``` where "Authorizer_Name" specifies an identifier of the network-addressable device 502, "Authorization_Token" is a token generated by the credential generation service described above, "Key_Name" specifies an identifier for the key provided to the credential generation service by the user, and "Token_Signature" specifies a value corresponding to the encrypted token fingerprint. In one embodiment, the "Authorization_Token" may by an identifier useable by the service provider 310 to obtain the token from data storage. The authorization service 508 may use the information specified in the request header to verify the authenticity of the request.

The authorization service 508 may send a request 510 to a credential data store 512, as described above, to obtain information corresponding to encrypted token fingerprint 504. The request 510 may request that the credential data store 512 provide information corresponding to information included in the encrypted token fingerprint 504. The request 510 may include identification information specified in the encrypted token fingerprint 504, such as an authorizer identifier and/or the identifier for the key. As described below in greater detail, preparing and sending the request 510 to the credential data store 512 may be dependent upon determination that the authorizer identifier in the received request is specified as an authorized identifier device in a record of authorized identifiers. Determining whether the network addressable device 502 is specified as an authorized device may include comparing the identifier of the network-addressable device 502 included in the request header with a set of authorized identifiers. If the authorizer does not correspond to one of the set of authorized identifiers, the authorization service 508 a may determine that a result 520 of the analysis is that the request from the network-addressable device 502 is inauthentic.

The credential data store 512 may attempt to find and obtain stored information corresponding to the identification information. If the credential data store 512 locates the stored information based on the identification information, the credential data store 512 may provide a response 514 including some or all of the stored information located. The stored information in the response 514 may include a token 516 that was generated by the credential generation service in response to a user request, as described above with respect to FIGS. 1, 2, and 4. The stored information in the response 514 may further include a cryptographic key 518 provided by the user in association with the user request to generate a new credential, and a hash function 524 indicated by the user in association with the request for a new credential. If, on the other hand the credential data store 512 cannot locate the stored information based on the identification information, the response 514 may include an indication that the requested information could not be located. In response, a result 520 of the authentication by the authentication service 508 may be a determination that the encrypted token fingerprint 504 corresponds to an inauthentic request. Accordingly, the authentication service 508 may provide a notification 522 that the request received from the network-addressed device 502 is invalid.

Based on receiving a response 514 including the requested information, the patient service 508 may proceed to analyze the encrypted token fingerprint 504 to determine the validity or authenticity of the request from the network-addressed device 502. The process for determining the validity may include two separate processes, which may be executed in parallel or in series to another. In a first one of the processes, the authentication service 508 analyzes the token 516 obtained from the credential data store 512. In particular, the authentication service 508 determines a hash function 524 that the user indicated in association with the request to provide a new credential described above. The authentication service 508 may use the token 516 as an input to a hash function 524 to generate a first fingerprint 526. In a second one of the processes, the authentication service 508 analyzes the encrypted token fingerprint 504 received from the network-addressed device 502. Specifically, the authentication service 508 attempts to decrypt the encrypted token fingerprint 504 to obtain a second fingerprint 528 by applying the cryptographic key 518 obtained from the credential data store 512. After successfully obtaining the first fingerprint 526 and the second fingerprint 528, the authentication service 508 may compare 530 the fingerprints to determine the authenticity of the request from the network-addressable device 502. If, however, the authentication service 508 is unable to produce the first fingerprint 526 and the second fingerprint 528 using the information obtained, then the authentication service 508 may determine that a result 520 of the analysis is that the request from the network-addressable device 502 is inauthentic.

If, based on the comparison 530, the authentication service 508 determines that the first fingerprint 526 is a match to the second fingerprint 528, then the authentication service 508 may determine that a result 520 of the analysis indicates that the request from the network-addressable device 502 is authentic. Accordingly, the authentication service 508 may provide a notification 532 that the request is authentic. For example, the notification 532 may be provided to the device platform service described above, which may determine to fulfill the request based on the notification 532. In one embodiment, the notification 532 may be provided to the policy service described above, which may then determine or generate policy information based on the notification 532 and provide the policy information to the device platform service.

Figure 6:
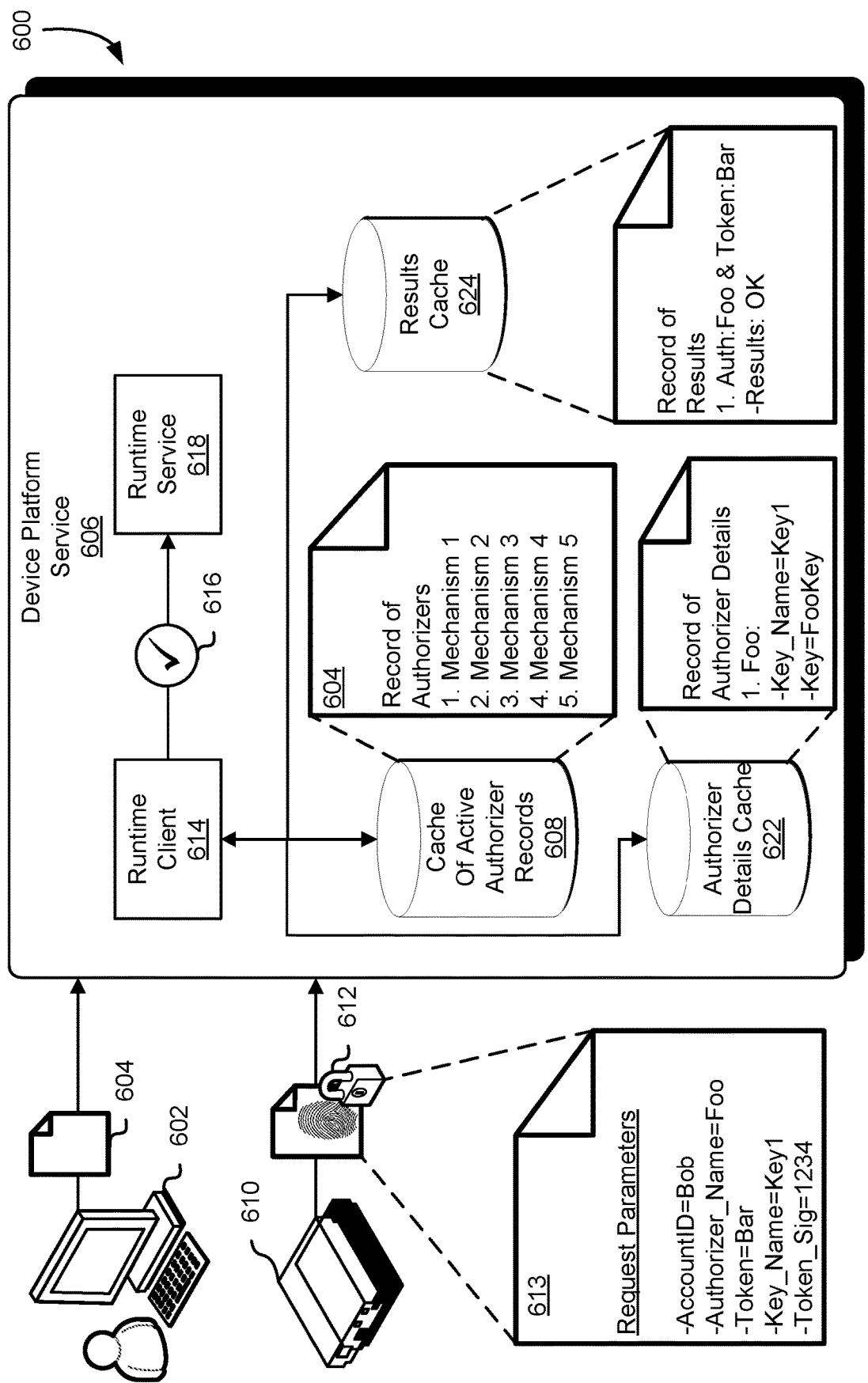
FIG. 6 illustrates an environment for caching records of authorization aspects of a computing resource service provider interacting with the device.

FIG. 6 shows an environment 600 for verifying that an authorizer of a request received by a device platform service is identified as being authorized to invoke a service call, such as a request to retrieve data from the credential data store described above. In one or more processes, a user 602 transmits a record of active authorizers 604 to a device platform service 606 of the computing resource service provider described herein. The record of active authorizers 604 may specify authorizers that, if provided in the request header of a request by a network-addressable device 610, will cause an authentication service of the service provider to invoke a call to the credential data store to retrieve credentials. The record 604 may be stored in data storage associated with a user or account—for example, a cache provided for a given user or account. The device platform service may store the record of active authorizers 604 in data storage accessible to the device platform service 606. For example, the device platform service 606 may store the record 604 in an cache of active authorizers records 608 in association with a user identifier of the user 602. The authorizers may be a bit string, such as a value or string of characters, indicated by the user 602 as being approved for the device platform service to make database calls. The record 604 of FIG. 6 includes five authorizer names that the user 602 has approved (i.e., "Mechanism 1", "Mechanism 2", "Mechanism 3", "Mechanism 4", "Mechanism 5"). Each of the authorizer names may correspond to an authentication mechanism for authenticating a request received.

A network-addressable device 610 may transmit a request 612 including an encrypted token fingerprint to the device platform service 606 as described above. The request 612 may include a set of request parameters 613, such as an authorizer name or identifier, an account identifier, a token, a token identifier, a key identifier, and/or a digital signature associated with the token, for example. The set of parameters 613 may be included or associated with the request 612 in one or more locations, such as in the header of the request 612, in the body of the request 612, in a Uniform Resource Identifier parameter associated of the request 612, by way of non-limiting example. The account identifier may be an identifier of the account or other information that is useable to identify an account or a user. Before the device platform service 606 attempts to verify the authenticity of the encrypted token fingerprint 612 (e.g. by providing the encrypted token fingerprint 612 to the authorization service described above), the device platform service 606 may parse the request 612 to determine an authorizer specified therein. The request header discussed above with respect to FIG. 5 includes an "Authorizer_Name" of "Foo", for example. The device platform service 606 may access an cache of active authorizers records 608 to determine whether the "Authorizer_Name" of "Foo" is included on the record 604. In particular, a runtime client 614 of the device platform service 606 may obtain the record 604 of authorizers 604 for the user 602, and compare the "Authorizer_Name" included in the header of the request with authorizers in the record 604. The runtime client 614 in this instance will determine that the "Authorizer_Name" of "Foo" is included in the record 604 of the user 602. Accordingly, the runtime client 614 may cause the device platform service 606 to initiate a call to the credential data store to authenticate the encrypted token fingerprint included in the request. If, on the other hand, the "Authorizer_Name" in the request 612 is not included in the record 604, the device platform service 606 may decline to authenticate the request 602. Accordingly, the device platform service 606 may return an indication that authorization failed to the user 602 in response to receiving a request with an authorizer not included in the record 604. Using the cache of active authorizers records 608 allows the device platform service 606 to initiate authentication for requests that include an authorizer on the record 604. Therefore, malicious users cannot cause the device platform service 606 to flood a database (e.g., credential data store) with requests.

The device platform service 606 may also maintain an authorizer details cache 622. For an account identifier and one or more of the authorizers in the record 604, the authorizer details cache 622 may include a token key name and a key (e.g., public key provided by the user 602 for the authorizer). For a request 612 that includes an authorizer in the record 604, the device platform service 606 may retrieve a key identifier (e.g., "key_name") and a key associated with the authorizer in the request 612 to compute and verify the signature. The key identifier and key may be obtained from the credential data store and stored in the authorizer details cache 622 after initially receiving and authenticating a valid request. This saves service calls to the credential data store by allowing the device platform service 606 to access key identifiers and keys for authorizers in the record 604 that were previously accessed.

The device platform service 606 may also maintain a results cache 624. For an account number and one or more authorizers in the record 604, the results cache 624 may include an authorization result for a given token-authorizer combination. For example, for a token "Bar" and an authorizer "Foo", the results cache 624 may indicate a successful authentication result. Accordingly, the device platform service 606 does not need to initiate a call to the credential data store because the token-authorizer combination has already been verified as being authentic.

The device platform service 606 may include a runtime service 618 in addition to the runtime client 614. If the runtime client 614 determines that the authorizer in the request is a match to one of the authorizers included in the record 604, and that the request is authentic, the runtime client 614 may provide a notification 616 to a runtime service 618 of the device platform service 606 that the request 612 is authentic. Accordingly, the runtime service 618 may initiate a service call to the appropriate service of the service provider. The runtime client may be an instance of a program instantiated in a runtime execution environment for performing a set of functions subsidiary to operation of the device platform service 606; for instance, the runtime client may be an agent running on computing resources of the device platform service 606.

Figure 7:
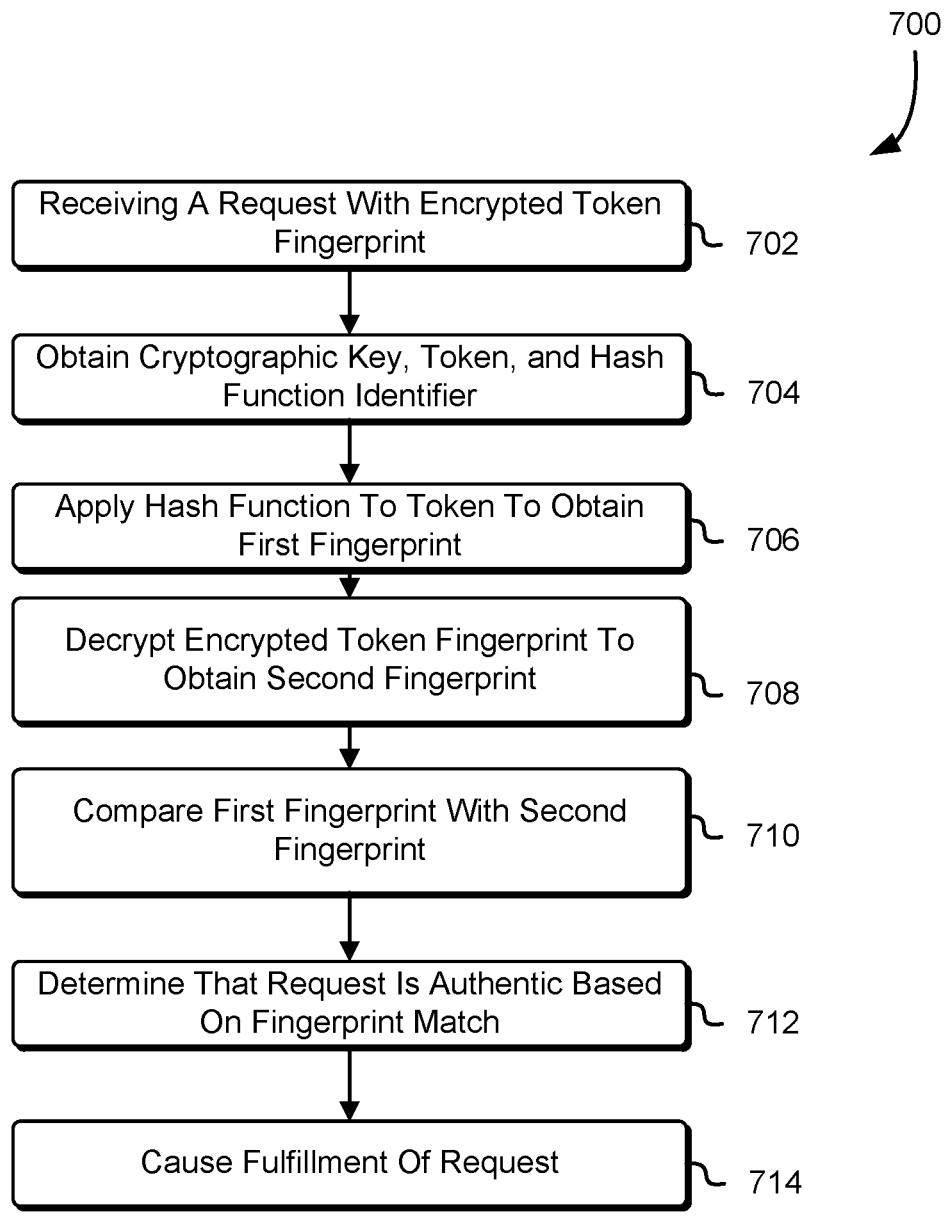
FIG. 7 illustrates a process for verifying the authenticity of a request submitted to a service by the device.

FIG. 7 shows a process 700 to verify the authenticity of the request received from the network-addressable device. The process 700 may be performed by the device platform service and/or the authentication service, which may be a part of the device platform service, as described above. The process 700 begins by receiving 702 a request from a network-addressed device to perform an operation within a computer resource service provider, as described above with respect to FIGS. 1, 3, and 5. The request may include an authorizer identifier and an encrypted token fingerprint. Next, the authentication service may obtain 704, based on the identifier of the network-addressable device, a cryptographic key, an identifier of a hash function, and a token associated with the authorizer identifier, as described above with respect to FIG. 5. The authentication service may then apply 706 a hash function corresponding to the identifier of the hash function to the token to obtain a first fingerprint, as discussed above with respect to FIG. 5. A second fingerprint may be obtained by decrypting 708 the encrypted token fingerprint included in the request.

The authentication service may compare 710 the first fingerprint with the second fingerprint to determine whether the request received is authentic, as described above with respect to FIG. 5. If the first fingerprint is a match to the second fingerprint, then the authentication service may determine 712 that the request is authentic. Accordingly, the authentication service may transmit a notification to one or more services causing 714 fulfillment of the request, as described above with respect to FIGS. 1, 3, and 5.

As described above with respect to FIG. 3, the device platform service may maintain a record of network-addressable devices that are authorized by the user to communicate with the device platform service to initiate operations in connection with services of a computing resource service provider. In particular, in response to a network-addressable device submitting a request for a service of the service provider to perform one or more operations, the device platform service may access a record of one or more network-addressable devices that are authorized to initiate operations. This prevents a malicious user to obtains an identifier for a token associated with the network-addressable device from flooding the device platform service, and data storage associated therewith, with a large number of malicious calls to unduly occupy system resources.

Figure 8:
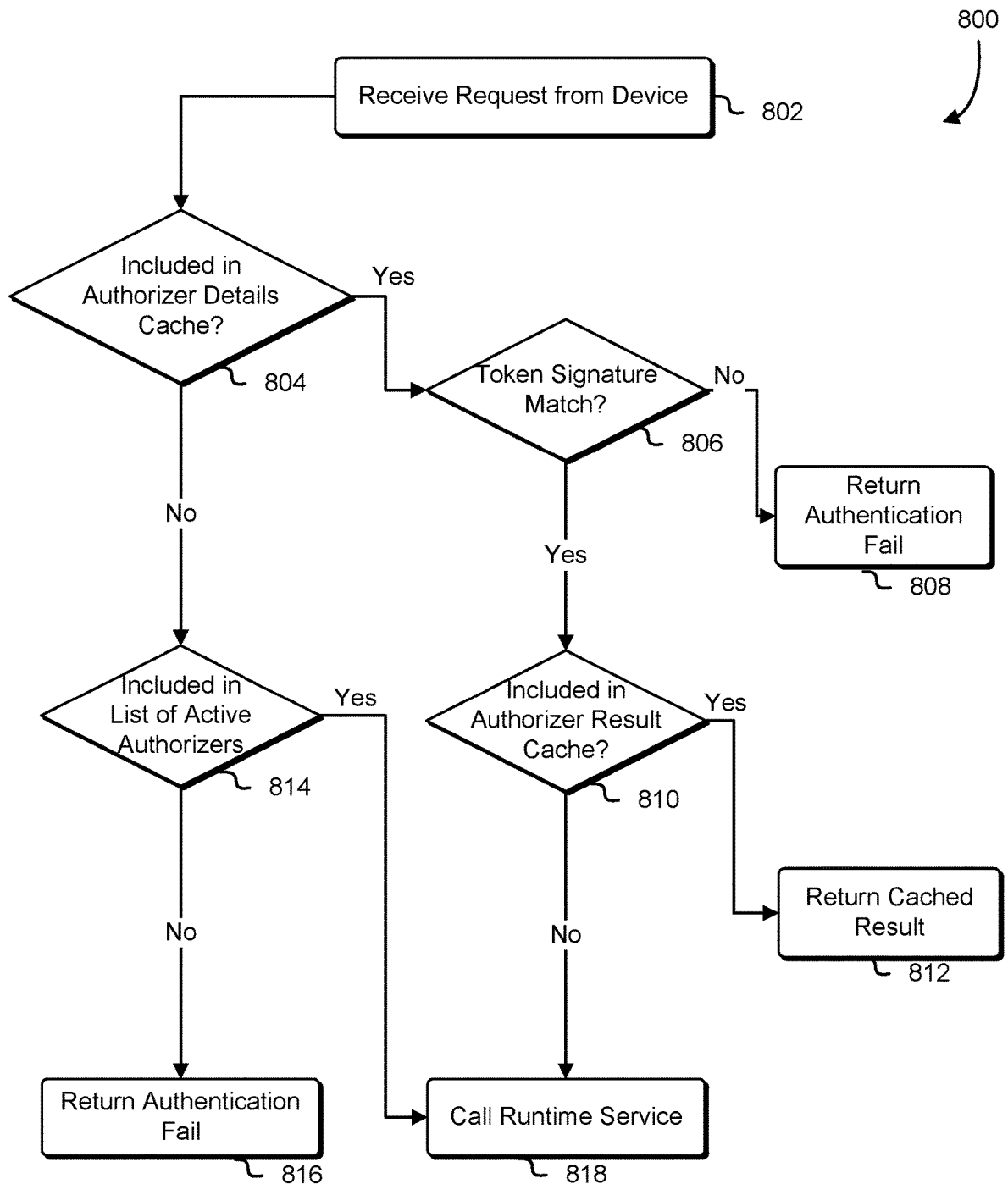
FIG. 8 illustrates a first process for authenticating requests using information stored in data storage.

FIG. 8 shows a process 800 for determining whether a request corresponds to an authorizer indicated as being an authorized identifier or corresponds to previously obtained authentic information. The process 800 may be performed by any appropriate computer system, such a runtime client executing in a device platform service. The process 800 begins by receiving 802 a request from a device, as described above with respect to FIGS. 1, 3, and 5. The request may include an authorizer identifier and an account identifier, as described above with respect to FIG. 6. The system may first determine 804 whether the authorizer details cache, such as the authorizer details cache 622 described above with respect to FIG. 6, includes information associated with the account identifier and the authorizer identifier. The information associated with the account identifier and the authorizer identifier may include a token name that is useable to retrieve an authorization token from the request header, and may include a cryptographic key to compute and verify the digital signature in an encrypted token fingerprint. If the authorizer details cache includes information associated with the account identifier and the authorizer identifier, then the system proceeds to determine 806 whether the authorization token retrieved from the authorizer details cache matches the token obtained by decrypting the encrypted token fingerprint using the cryptographic key. If not, then the system returns 808 a notification that the authentication failed. If, however the token signature matches 806, then the system proceeds to determine 810 whether a result of the token-authorizer combination is stored in the results cache described above with respect to FIG. 6. If so, the result is retrieved from the results cache and returned 812 to the requesting device. If not, then the system initiates a call to the runtime service described above with respect to FIG. 6.

Returning to step 804, if the authorizer details cache does not include information associated with the account identifier and the authorizer identifier, then the system proceeds to determine 814 whether the authorizer identifier is included in the record of authorized identifiers described above (e.g., record 604 indicating active authorizers). If not, then the system determines 816 that the request does not correspond to an authorized identifier (i.e., does not include a valid token authorizer), and returns a notification to the requesting device that authentication failed. If, on the other hand, the authorizer identifier in the request is included in the record of authorized identifiers, then the system proceeds to call 818 the runtime service at which point the service may obtain a token (e.g., from the credential data store) to determine whether the token matches the token obtained by decrypting the encrypted token fingerprint.

Figure 9:
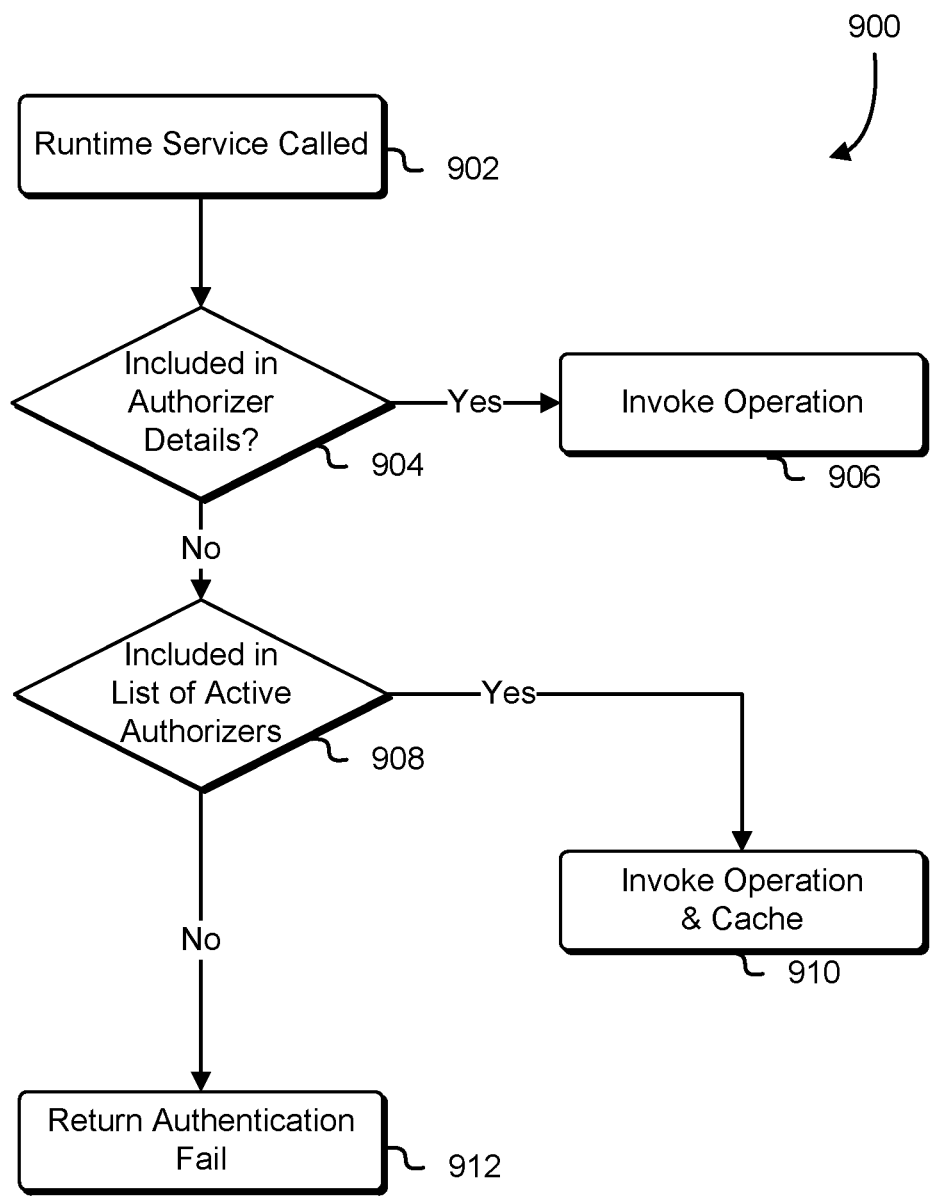
FIG. 9 illustrates a second process for authenticating requests using information stored in data storage.

FIG. 9 illustrates a process 900 for determining whether a request includes information sufficient to authenticate the request as being authentic. The process 900 may be performed by any appropriate computer system, such a runtime service (i.e., the service 328 described above with respect to FIG. 3). The runtime service may maintain the authorizer details and record of authorized identifiers described above. The authorizer details cache for the runtime service may also maintain a resource identifier, such as an identifier identifying a resource of the service provider. The process 900 begins by receiving 902 a runtime service request, such as from the runtime client described above. The process 900 then determines 904 whether the account identifier and the authorizer identifier are included in the authorizer details cache for the service. If so, the runtime service invokes 906 one or more operations associated with the authorizer identifier (e.g., in a user's identity and access management service). If not, then the process 900 proceeds to determine 908 whether the authorizer identifier is included in the record of active authorized identifiers. If the authorizer identifier is included in the record of active authorized identifiers, then the service may invoke 910 one or more operation associated with the authorizer identifier and cache the details in the authorized details cache for the service. If the authorizer identifier is not included in the record of authorized identifiers, then the service may return 912 a notification that the request authentication failed.

Figure 10:
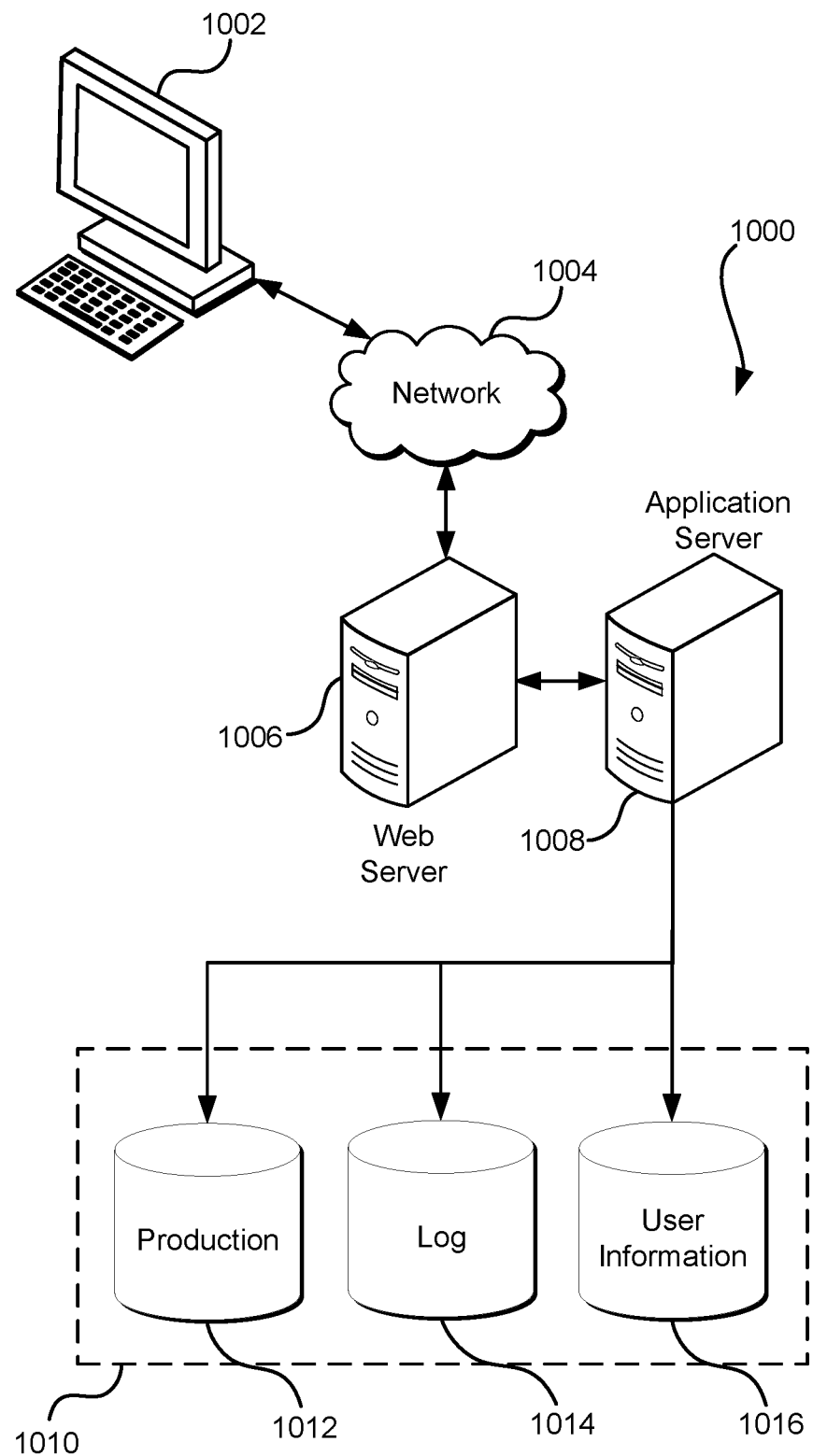
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes, and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, at a service of a computing resource service provider, a request with a token indicative of a registered network-addressable device of a customer, a digital signature associated with the token and signed by a private key of a public/private key pair, and an identifier registered by the customer of the computing resource service provider in association with a public key and associated with an authorizing mechanism usable to perform an operation on the token, the token comprising at least a credential useable to authenticate the registered network-addressable device;
determining, at the service and based at least in part on the identifier, the public key, of the public/private key pair, from a plurality of public keys, wherein the plurality of public keys are associated with a plurality of registered network-addressable devices;
verifying the digital signature based at least in part on the token and the public key; and
as a result of successful verification of the digital signature, performing an authorization routine to determine whether fulfillment of the request is authorized, the authorization routine including at least performing the operation on the token based, at least in part, on the authorizing mechanism associated with the identifier and performing a comparison process based on at least performing the operation on the token.

2. The computer-implemented method of claim 1, further comprising determining the identifier is a match to an identifier in a record of identifiers at the service.

3. The computer-implemented method of claim 2, the method further comprising determining the identifier is a match to the identifier in the record of identifiers is a condition precedent to determining the public key.

4. The computer-implemented method of claim 1, wherein the request is received from a network-addressable device of the customer, and the service is for interfacing the network-addressable device with other services of the computing resource service provider.

5. The computer-implemented method of claim 1, wherein verifying the digital signature further comprises decrypting an encrypted token fingerprint.

6. The computer-implemented method of claim 1, wherein the identifier is defined in association with obtaining the token in a registration process.

7. The computer-implemented method of claim 1, wherein the public/private key pair is generated using an asymmetric key generation algorithm for generating cryptographic keys.

8. A system at least partially implemented by hardware, comprising:
   one or more processors; and
   memory that stores computer-executable instructions that, as a result of execution by the one or more processors, cause the system to:
   receive a request with a token indicative of a registered network-addressable device of a customer, a digital signature associated with the token and signed by a private key of a public/private key pair, and an identifier registered by the customer in association with a public key and associated with an authorizing mechanism usable to perform an operation on the token, the token comprising at least a credential useable to authenticate the registered network-addressable device;
   determine the public key, of the public/private key pair, from a plurality of public keys, wherein the plurality of public keys are associated with a plurality of registered network-addressable devices;
   verify the digital signature based at least in part on the token and the pubic key; and
   as a result of successful verification of the digital signature, perform an authorization process to determine whether fulfillment of the request is authorized, the authorization routine including at least performing the operation on the token based, at least in part, on the authorizing mechanism associated with the identifier and performing a comparison process based on at least performing the operation on the token.

9. The system of claim 8, wherein the request is received from a network-addressable device of the customer.

10. The system of claim 8, wherein verification of the digital signature includes decrypting an encrypted token fingerprint.

11. The system of claim 8, wherein the memory that stores the computer-executable instructions that, as a result of execution by the one or more processors, cause the system to further determine the identifier is a match to an identifier in a record of identifiers.

12. The system of claim 8, wherein customer-defined policy information is retrieved as a result of successful verification of the digital signature, the customer-defined policy information specifying permissions for performing one or more operations in fulfillment of the request.

13. The system of claim 8, wherein determining that the identifier is a match to the identifier in the record of identifiers is a condition precedent to determining the public key.

14. The system of claim 8, wherein the identifier is defined by the customer in association with obtaining the token in a registration process.

15. The system of claim 8, wherein the public/private key pair generated using an asymmetric key generation algorithm for generating cryptographic keys.

16. A non-transitory computer-readable storage medium having stored thereon executable instructions that, as a result of being executed by one or more processors of a computer system, cause the computer system to at least:
   receive a request with a token indicative of a registered network-addressable device of a customer, a digital signature associated with the token and signed by a private key of a public/private key pair, and an identifier registered by the customer in association with a public key and associated with an authorizing mechanism usable to perform an operation on the token, the token comprising at least a credential useable to authenticate the registered network-addressable device;
   determine the public key, of the public/private key pair, from a plurality of public keys, wherein the plurality of public keys are associated with a plurality of registered network-addressable devices;
   verify the digital signature based at least in part on the token and the public key; and
   as a result of successful verification of the digital signature, perform an authorization process to determine whether fulfillment of the request is authorized, the authorization routine including at least performing the operation on the token based, at least in part, on the authorizing mechanism associated with the identifier and performing a comparison process based on at least performing the operation on the token.

17. The non-transitory computer-readable storage medium of claim 16, wherein the request is submitted by a network-addressable device of the customer.

18. The non-transitory computer-readable storage medium of claim 16, wherein the public/private key pair is generated using an asymmetric key generation algorithm for generating cryptographic keys.

19. The non-transitory computer-readable storage medium of claim 18, wherein the identifier is defined by the customer in association with obtaining the token in a registration process.

20. The non-transitory computer-readable storage medium of claim 16, wherein customer-defined policy information is retrieved as a result of successful verification of the digital signature, the customer-defined policy information specifying permissions for performing one or more operations in fulfillment of the request.

* * * * *